United States Patent [19]

Koerner

[11] 4,106,612

[45] Aug. 15, 1978

[54] GRIPPER FOR CASE UNLOADER

[75] Inventor: Heinz Albrecht Koerner, Macedonia, Ohio

[73] Assignee: MBI Corporation, Northfield, Ohio

[21] Appl. No.: 726,117

[22] Filed: Sep. 24, 1976

[51] Int. Cl.² ............................................. B65G 47/86
[52] U.S. Cl. .................................. 198/479; 198/653; 214/1 BA; 214/309; 294/110 R
[58] Field of Search ............... 198/479, 653, 654, 695; 214/1 BA, 309; 294/87.22, 87.24, 110 R

[56] References Cited

U.S. PATENT DOCUMENTS

| 748,222 | 12/1903 | Sites | 294/110 R |
|---|---|---|---|
| 2,911,251 | 11/1959 | Osborn | 294/110 R |
| 3,697,118 | 10/1972 | Johnstone | 294/110 R |
| 3,951,285 | 4/1976 | Barker | 198/479 X |

FOREIGN PATENT DOCUMENTS

| 817,796 | 8/1959 | United Kingdom | 294/110 R |
|---|---|---|---|
| 1,224,694 | 10/1971 | United Kingdom | 294/110 R |
| 1,255,671 | 12/1971 | United Kingdom | 294/110 R |

*Primary Examiner*—Evon C. Blunk
*Assistant Examiner*—James L. Rowland

*Attorney, Agent, or Firm*—Wood, Herron & Evans

[57] ABSTRACT

Apparatus for automatically lifting containers, such as bottles, especially bottles from moving cases. A series of closely adjacent, self-operating grippers are carried along an endless path above a moving case or cases to be emptied. The grippers are laterally aligned with the columns of containers in a case and randomly grip the containers in an aligned row as they are guided into engagement. The grippers yield upwardly if obstructed as they are guided toward engagement with containers, thereby permitting full depth cases to be emptied without coordinating a longitudinal relationship between any particular group of grippers and the case.

Each bottle gripper has two tong arms pivoted to each other and connected by links to a support for movement between a downwardly depending closed condition and an upward retracted open position. A gravity-actuated detent is mounted in one tong arm and is adapted to move into engagement with the other tong arm. The other tong arm has a recess or bore which the detent engages when the tong arms are in the retracted position so as to hold the tong arms in a retracted position after the grippers have deposited bottles on a receiving conveyor.

7 Claims, 14 Drawing Figures

Fig. 1

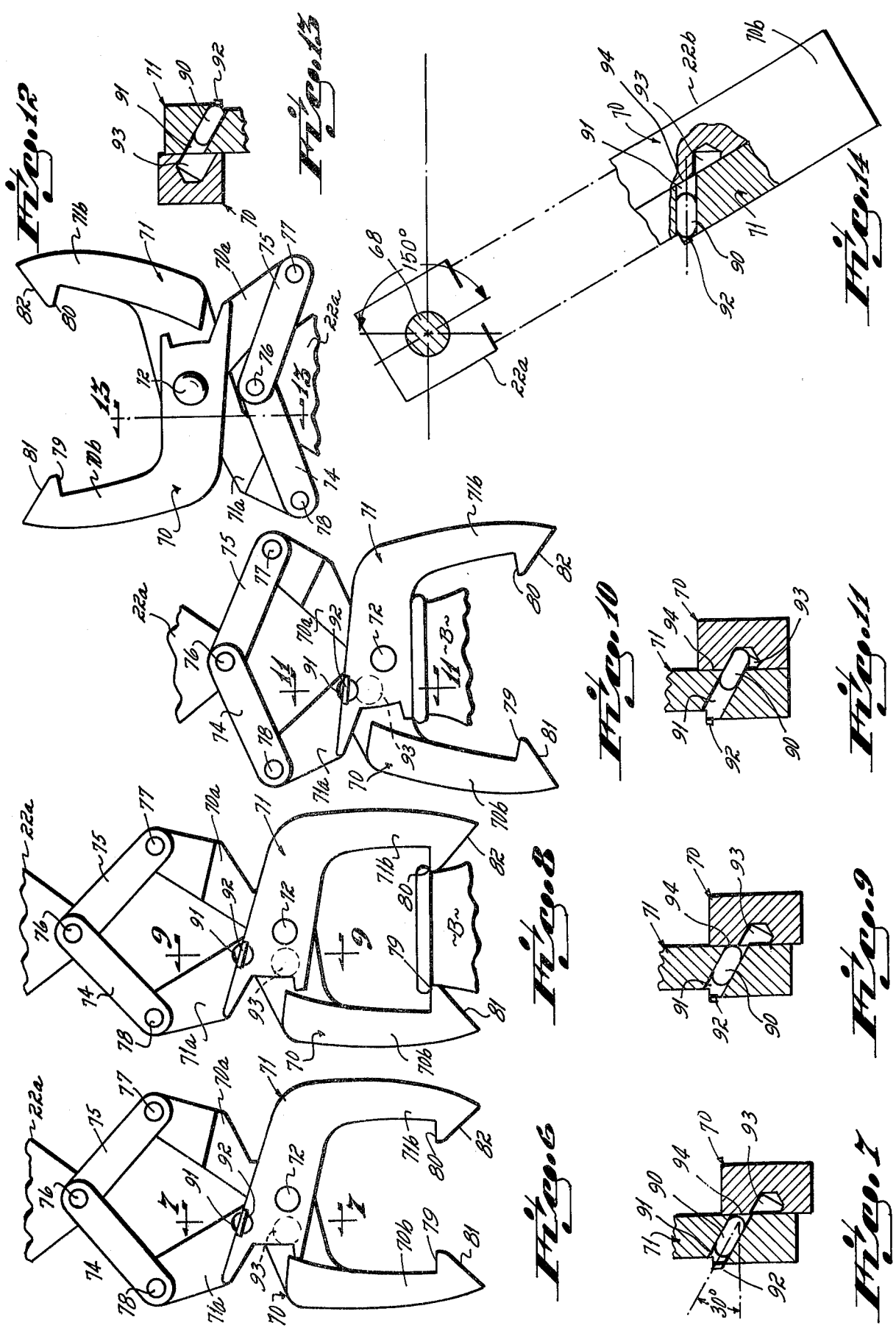

GRIPPER FOR CASE UNLOADER

This invention relates to tong-type grippers for a bottle uncaser of the type which is described in U.S. Pat. No. 3,951,285.

Briefly, the patented apparatus utilizes a generally horizontal case conveyor and a driven unloading conveyor above the case conveyor. Parallel columns of closely adjacent grippers are carried by the unloading conveyor along an endless path in the same general direction as the case conveyor. Each column is aligned with a column of containers in a moving case to be unloaded. The grippers are of tong-like construction, adapted to grip the containers, such as bottles, on opposite sides of a rim or neck portion.

The path of movement of the grippers is controlled so that they approach the path of a horizontally moving case at an angle to the horizon, engage the containers, and depart from the path of case movement at an angle opposite to that of the approach. At the juncture of the approach and departure angles, the grippers extend to a level at which they are beneath the tops of the containers and of course are beneath the upper edge of a full-height case.

By virtue of the tong-like construction of the grippers, they will open if the ends are pushed upward and will close when freely suspended. Thus, as the suspended grip fingers move in an approach angle toward a case, they open upon contact with a container top as their downward movement is obstructed. The grip fingers then receive the upper structure of the container, such as the crown rim or reinforcing ring of a bottle, and close as they are lifted away from the gripped container upon movement along them departure angle from the case conveyor path.

The grippers are gravity-biased to an extended, closed position when suspended along the lower reach of the unloading conveyor, directly above the case conveyor. The fingers are relatively light in weight and hence are easily displaced upwardly by a container or by the edge of the case end walls on a full-height case. Sufficient upward displacement is accommodated by the gripper construction to prevent any development of undue force or interference between the gripper and the case when the case end wall obstructs downward movement. Easy self-releasing of a carried container is also assured by this construction when the gripper is guided along a path that lowers the containers onto a support surface such as a bottle-receiving conveyor. Once the containers are supported, continued lowering of the gripper toward the support spreads the tong arms to release the container. Thereafter, relative movement of the gripper with respect to the container, as by movement in an arc upwardly and forwardly from the container, completes the release.

In some circumstances as, for example, with small bottles which are closely spaced, the release of the containers from the grippers, after the containers are placed on a support, is difficult to achieve. As soon as a gripper releases a container, the gripping jaws close. In reclosing, the jaws may inadvertently grip another or the same container. Further, upon swinging upwardly toward the upper reach on the conveyor on which they are mounted, the closing gripper jaws might strike a bottle, knocking it over. To eliminate the criticality attending the release of the bottles, it is a feature of the present invention to provide a detent which is operable to hold the gripper jaws open when the jaws deposit a container on the support, the jaws remaining open until each gripper begins its swinging movement from the upper reach of the conveyor around to the lower reach of the conveyor.

More specifically, the invention contemplates a gravity-operated detent slidably mounted in a hole in one of the arms of the gripper tongs. The detent has a three-position relationship with the arms of the tongs. In a first position, with the gripper depending from the lower reach of the conveyor and the tongs extended, the detent is in a cocked position resting on a surface of the other arm. In a second position, achieved when the jaws are opened, the detent is locked in a recess or bore in the other arm, the detent having moved by gravity to that locked position.

In a third position, achieved when the grippers are inverted on the upper reach of the conveyor, the detent has moved by gravity to a retracted position in the hole in the first arm.

As each gripper swings from the upper reach around to the lower reach, the tongs extend before the detent moves out of the retracted position. This occurs when the tongs have swung slightly below a horizontal position. Thereafter, the detent slides to the cocked position.

The above and other features and advantages of this invention will become more apparent from the detailed description which follows, when considered in connection with the accompanying drawings in which:

FIG. 1 is a side elevational view of a case unloader embodying the present invention, diagrammatically illustrating the manner in which bottles are removed from cases;

FIGS. 6–14 are fragmentary views illustrating the several operative positions of the grippers.

Figure 1:
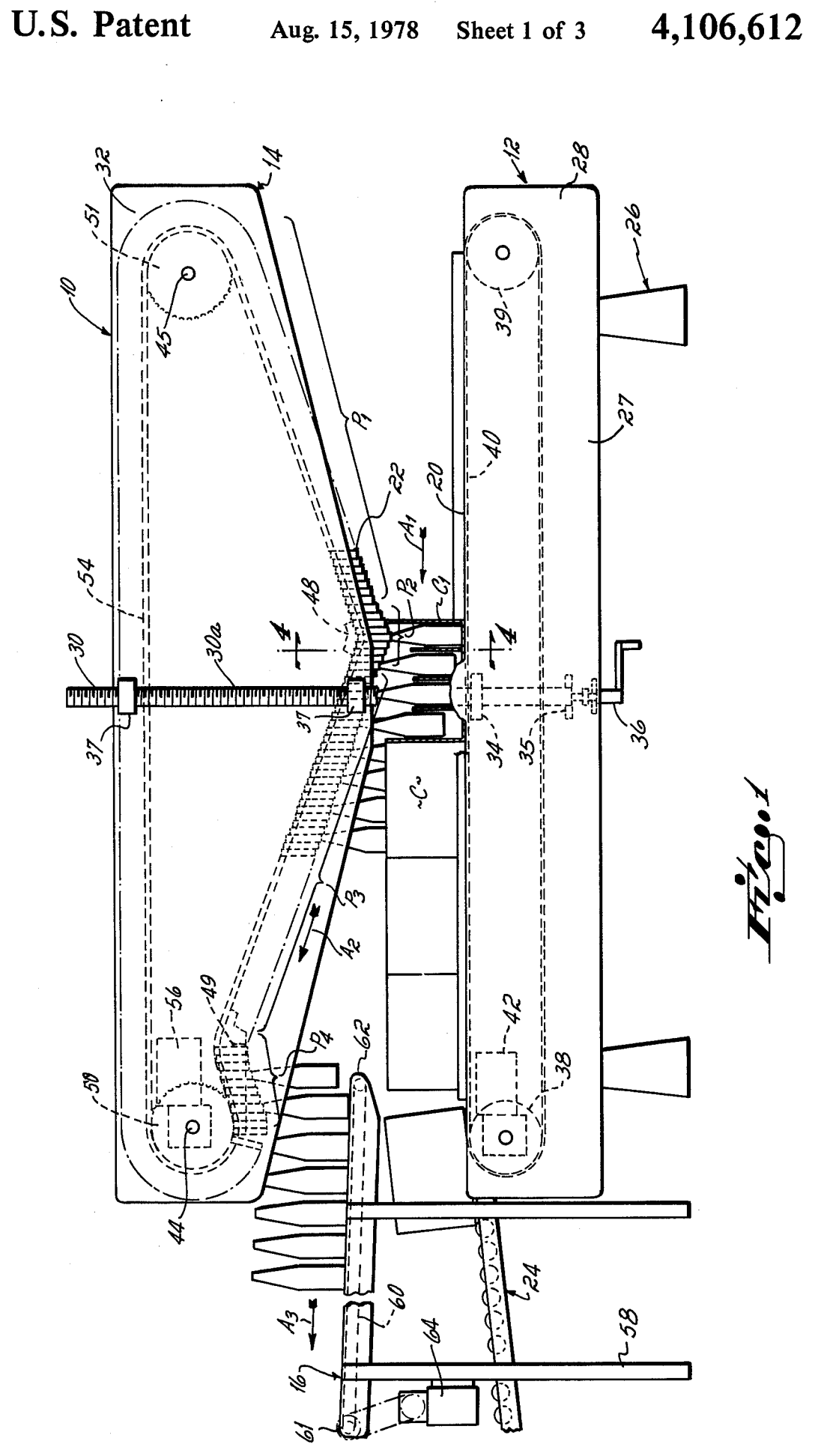
Figure 2:
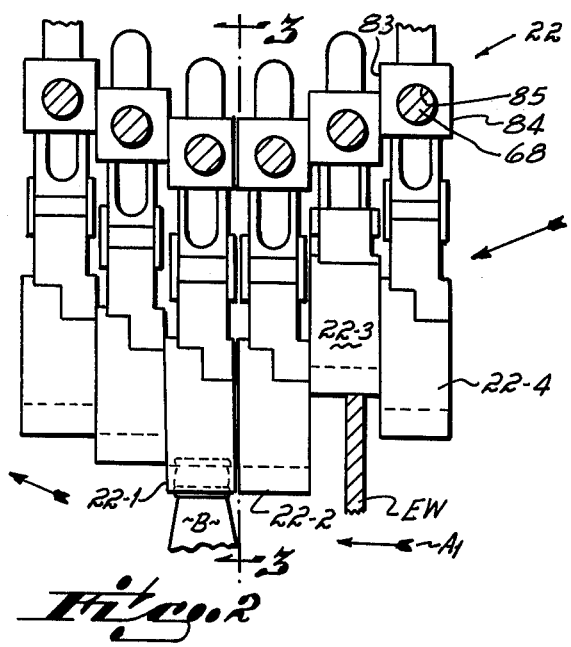
FIG. 2 is a fragmentary side elevational view of the apparatus of FIG. 1 illustrating in detail the manner in which grippers engage a container in a full-height case and accommodate an end wall of the case.

A case unloader 10 embodying the present invention is shown in FIG. 1 for engaging and lifting containers B from cases C. The unloader 10 includes a case conveyor 12 that moves cases along a horizontal path for unloading, a container-engaging and transporting conveyor 14 above the conveyor 12 for lifting containers from the moving cases, and a container-receiving conveyor 16 adjacent to and below the conveyor 14 for receiving containers released by the conveyor 14 and transporting them from the release area.

As diagrammatically illustrated, an endless belt 20 of the case conveyor 12, driven at a uniform speed with the upper reach moving in the direction of the arrow A1, carries cases C along a horizontal path beneath and at the same horizontal speed as the container conveyor 14. Grippers 22 of the conveyor 14 are carried downward along an inclined path portion P1 toward the case C1 to grip containers B within the case at a path portion P2. The grippers and the gripped containers are then carried upwardly along an inclined path portion P3 away from the case, and then are subsequently moved downward to deposit the containers on the receiving conveyor 16. Empty cases C are discharged to a roller conveyor 24.

The case conveyor 12 and the container conveyor 14 are carried by support structure 26 that includes a base framework 27, two laterally spaced lower side plates 28, two vertical screws 30, one on each side of the conveyors at a longitudinally central location, and two laterally spaced upper side plates 32. The screws are each carried by and journaled in two vertically spaced lugs 34, 35 on each lower side plate 28, and a threaded portion 30a of each screw is received in vertically spaced internally threaded lugs 37 carried by each upper side plate 32. A crank 36 secured to the lower end of one of the screws 30 and connected through a chain drive (not shown) to the lower end of the opposite screw 30, can be rotated to turn the screws and adjust the height of the conveyor 14 relative to the conveyor 12 to accommodate containers and cases of different heights.

The lower side plates 28 support the endless belt 20 on a drive roll 38, an idler roll 39, and a slide plate 40 underneath the upper reach of the belt 20. The drive roll 38 is driven by an electric motor 42 to move the belt to carry the cases C in the direction of the arrow A1.

Chain wheel shafts 44, 45 extend between and are carried by opposite ends of the upper side plates 32. Two chain wheels 50 are carried by the shaft 44 adjacent the inside surfaces of the upper side plates and two chain wheels 51 are carried by the shaft 45 aligned with the wheels 50. Each pair of chain wheels 50, 51 carries a chain 54. Chain guides 48 are carried by each of the side plates 32 to guide the lower reach of each chain along the path shown in FIG. 1. The chains 54 are driven in the direction of the arrow A2 in FIG. 1 by a motor 56 that drives the shaft 44.

A separate frame 58 supports the conveyor 16 and the roller conveyor 24. The conveyor 16 has an endless belt 60 extending about a driven roller 61 at one end of the conveyor and about an idler roll 62 at the other end. A motor and drive belt assembly 64 drive the roller 61 to move the belt 60 in the direction of the arrow A3.

Each link of the two laterally-spaced chains 54 carries a cross rod 68 that extends between the chains. See FIG. 4. A plurality of grippers 22 is carried on each cross rod 68, five being carried in the embodiment shown in FIG. 4.

Figure 3:
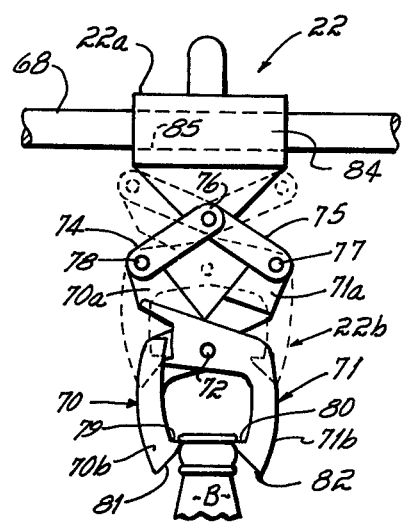
FIG. 3 is a fragmentary front elevational view of a portion of the conveyor of FIG. 2 taken along the plane indicated by the line 3—3 illustrating in detail the construction of a gripper.

As best shown in FIGS. 2 and 3, the grippers 22 each have a support part 22a carried for pivoting and sliding on the rod 68, and a container gripping part 22b that engages the containers to be removed from a case. The gripping part 22b is comprised of two tong arms 70, 71 secured together by a pivot pin 72 intermediate two ends 70a, 70b and 71a, 71b of each arm. The ends 70a, 71a are connected to a common pivot 76 on the support part 22a by pivoted link pairs 74, 75, respectively, on the front and back side of each arm, secured thereto by pivot pins 77, 78.

The ends 70b, 71b have inwardly directed flat horizontal support surfaces or jaws 79, 80, respectively, that face upward when the grippers are suspended, as shown in FIG. 3. The surfaces are constructed to support a container by engaging a rim, crown ring or the like on diametrically opposite sides of the container. The extremities of the ends 70b, 71b have external surfaces 81, 81 that are inclined upwardly and inwardly and which serve to cam the arms open as they are lowered onto a container. The arms 70, 71 hold the surfaces 81, 82 spaced apart a distance sufficient to engage a container top on opposite sides when the arms are in a closed position so they will be cammed open as they are lowered.

As best shown in FIG. 2, the ends 70a, 71a are thinner than the ends 70b, 71b so the links 74, 75 are recessed with respect to the front and back surfaces of the grip fingers, permitting the ends 70b, 71b of the arms of each gripper to be in direct engagement with those of the next adjacent gripper. The thickness of the ends 70b, 71b, i.e., the dimension in the direction of conveyor travel, is approximately equal to the dimension, in the same direction, of the container portion to be gripped. This eliminates any possibility that the gripper overlying the container can be interfered with by any obstruction adjacent the containers. It also minimizes the possibility that the container (especially a container with a circular periphery) will be engaged and lifted by more than one gripper.

Figure 4:
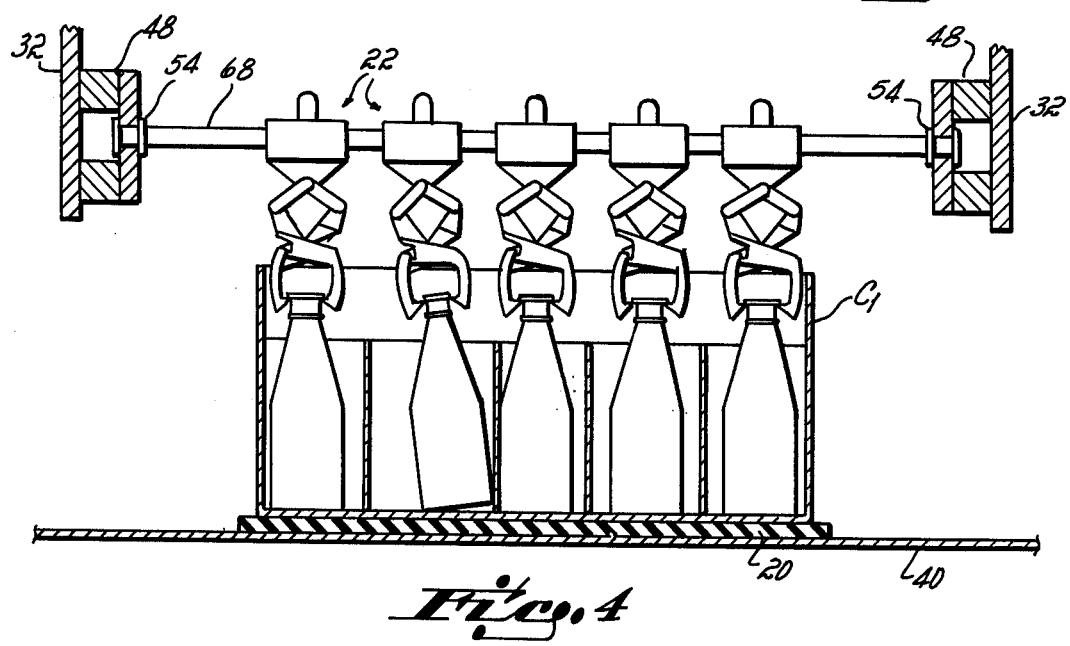
FIG. 4 is a partial transverse sectional view taken along the plane indicated by the line 4—4 of FIG. 1 and diagrammatically indicates the manner in which the grippers are transversely spaced in columns and in which a misaligned container can be gripped.

The support part 22a has parallel front and back walls 83, 84, as best shown in FIG. 2, that are part of a generally rectangular portion through which an aperture 85 is provided for receiving the cross rod 68 with clearance. The clearance facilitates sliding of the support part on the rod to adjust the lateral position of the columns of grippers relative to the columns of bottles to be removed from cases. The sliding also facilitates self-adjusting of the grippers if they engage a container misaligned in the column. This is best illustrated in FIG. 4, in which the gripper 22, second from the left, has engaged a misaligned container. As the rod 68 lifts the grippers and containers, the tendency will be for the support part 22a second from the left in FIG. 4, to slide toward the right into alignment with the container and then properly apply pressure to the container through the grip part 22b to lift it.

Figure 5:
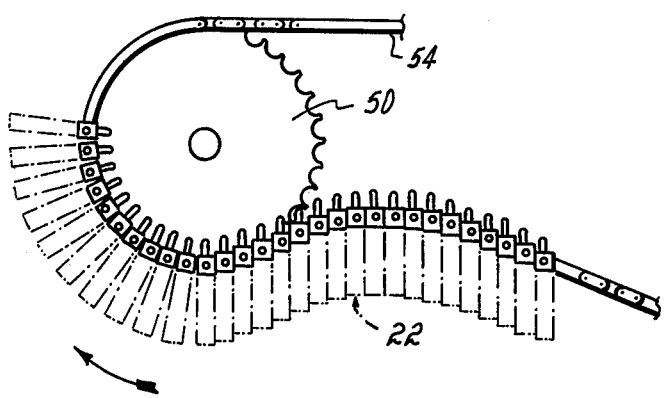
FIG. 5 is a partial side-elevational view of the apparatus of FIG. 1, with parts removed, illustrating the path of movement of the grippers at the location where the containers are released and illustrating the spacing achieved between grippers to facilitate release.

The pivoting facilitated through the clearance between the rod 68 and support part 22a permits the grippers to hang vertically when the chain 54 is moving along a path at an angle to the horizontal. The thickness of the support part 22a, between the front and back walls 83, 84, is slightly less than the pitch of the chain 54, by an amount coordinated with the angle of chain travel in the approach and departure to the case conveyor along path portions P1, P3, so that the grippers are in surface-to-surface contact, each with the next, along the path portions P1, P3. This assures that the grippers will be as close together as possible at the bottom position P2 where they engage the upper portions of the containers B, and therefore will be certain to engage the containers without predetermined coordination between the cases and the grippers in the longitudinal direction of travel. It also assures that the grippers will extend generally radially of the sprocket 50 as they travel around the path defined by the sprocket. See FIG. 5. This provides a separation between adjacent grippers at the location where they release the containers and accelerates the distal ends of the grippers away from the released containers.

The grip portion 22b moves through a substantial distance between an extended position of the tong arms 70, 71 as shown in FIG. 3 in solid line, and a fully lifted or retracted position, as shown in dotted lines. As illustrated in FIG. 2, this distance adequately accommodates the end wall of a full-height case, without obstructing movement of the grippers along the path, relative to the cases. The weight of the tong arms holds them in an extended position on the lower reach of the conveyor travel. When the tong arms are upside down, as on the upper reach, they are in the retracted position shown in phantom in FIG. 3, but inverted.

As shown in FIG. 2, grippers 22-1 and 22-2 are at the lowest point of travel. Gripper 22-1 has engaged a container B. Gripper 22-3 is engaged with and resting on an end wall EW of the case C1 and is lifted partially upward from its extended position. Gripper 22-4 is outside the case C1. All grippers shown in FIG. 2, except 22-1 and 22-2 are in front-to-back contact, each with the next, because the chain carrying the grippers is oriented at an angle of approach or departure with the horizon. At the bottom of the travel, where the direction of chain travel is essentially horizontal along path portion P2, there is a slight space between the adjacent grippers, as between grippers 22-1 and 22-2. This distance, for example, may acceptably be approximately 1/16 inch. Once the grippers move from the lower position along the path of departure P3 from the case conveyor, the grippers support a container B, as best shown in FIG. 1, lifting it from the case.

In a preferred embodiment, a chain pitch of 1 inch is used and the width of the support part 22a, between the surfaces 83, 84 is 15/16 inch. The angle of departure and approach of the chain relative to a horizontal plane is 20 $\frac{1}{2}$°. With that arrangement, the grippers hang vertically with the adjacent surfaces 83, 84 of adjacent grippers in face-to-face contact when the chain travels along the inclined approach P1 or the inclined departure path P3. Also, the support parts 22a interfere with pivoting as the grippers are moved about the sprockets 50, holding them radially of the sprocket.

As shown in FIG. 1, the chains 54 are directed from the angle of departure along path P3 into a slight angle of approach along a path portion P4 by the guide plates 49. The conveyor 16 underlies the sprockets 50 and those portions of the chains 54 that are redirected downward. Containers B carried by the grippers will then be lowered onto the conveyor 16 and will make contact with the conveyor prior to the grippers reaching the lowest part of the path portion P4. The further movement of the grippers toward the conveyor 16 after the containers are supported by the conveyor, will cause the tong arms 70, 71 to open and be maintained open, as will be described below. The grippers will then be swung in an arc about the circumference of the chain wheels 50, moving them away from the supported containers. At the same time, the supported containers will be moved away by the conveyor 16 for further processing.

As best shown in FIGS. 6–14, each gripper is provided with a gravity-operated detent 90 whose primary function is to hold the gripper in a jaw-open position after it has deposited its bottle on the downstream conveyor. The tong arm 71 has a hole 91 in its face extending through the arm. The hole has an axis which lies at an angle of about 30° to horizontal when the gripper is in its operative depending position. The detent 90, preferably of metal, is slidably mounted in the hole 91. The angle of the axis of the hole and the frictional relationship of the detent with respect to the tong arm material is such that the detent will move freely downwardly when the gripper is in its normal downwardly depending position. The outer end of the hole 91 is at least partially closed as by only partially forming the hole through the thickness of the tong arm 71 to provide an abutment 92 which prevents the escape of the detent out of the hole.

The inner end of the hole, that is, the end lying adjacent the other tong arm 70, is open so as to permit the detent to pass out of the hole.

The other tong arm 70 has a bore 93 formed about halfway through the thickness of the tong arm, the bore being adapted to receive one end of the detent 90. When the tong arms are in their fully extended downwardly depending position, the bore and hole are misaligned, as shown in FIG. 7, so that the detent rests against the surface 94 of the tong arm 70. When the tong arms are in a downwardly depending retracted position, as shown in FIG. 11, the hole and bore are aligned so that the detent is free to slide partially out of the hole with one end entering into the bore, thereby to hold the tong arms in a retracted position. When the tong arms are in an inverted position, as shown in FIG. 12, the tong arms remain in a retracted position as urged by gravity, but the detent is urged by gravity to slide out of the bore 93 and fully into the hole 91.

When the grippers swing slightly below a horizontal position, as shown in FIG. 14, they are gravity-urged to an extended position, but until the axis of the hole 91 swings past horizontal, the detent is prevented from moving out of the hole toward the other tong arm, thus the tong arms can move to the fully extended position without being impeded by the detent inadvertently sliding into the bore 93.

In the operation of the invention, the grippers 22 move downwardly into engagement with respective bottles of a case, as shown in FIG. 1, and are cammed open slightly so that the jaws 79, 80 grip the neck of a bottle. That slight opening, as shown in FIGS. 8, 9, is insufficient to bring the hole and bore into alignment. As the grippers are conveyed in an upwardly inclined path P3, with a Case C from which the bottles are to be removed moving at the same horizontal speed as the grippers, the grippers lift the bottles out of the case. The bottles are conveyed upwardly until they overlie the receiving conveyor 16. The bottles are then lowered in path P4 onto the receiving conveyor, with the grippers being forced downwardly against the tops of the bottles to force the tong arms upwardly with respect to their supports 22a into a retracted position. In the retracted position, as shown in FIGS. 10 and 11, hole and bore are aligned and the detent 90 passes into the bore.

In this attitude, the grippers are held in a jaw-open retracted position. In this position, the grippers are free to swing upwardly out of the way of the bottles just deposited on the receiving conveyor 16 and the jaws will clear the bottles, thereby avoiding any possibility of interference between the grippers and the deposited bottles.

The grippers then swing upwardly into an inverted attitude on the upper reach of the conveyor wherein the retracted position is maintained. However, in the inverted position the axis of the hole 91 is now at 60° to horizontal with the detent being gravity-urged out of the bore 93, as shown in FIGS. 12, 13.

The detent will remain in that attitude until the grippers have swung through at least 150° from the inverted position toward the downwardly depending position, as shown in FIG. 14. As can be seen from FIG. 14, the axis of the hole 91 has not passed horizontal. At some point in the gripper's travel around the end of the conveyor between a horizontal position and the 150° position of FIG. 14, gravity will cause the tong arms of each gripper to extend to a fully extended position, as shown in FIG. 14. Thereafter, during continued travel of the grippers past the 150° position to a vertical downwardly depending position the detent 90 will slide into engagement with the surface 94 of the other tong arm and will remain there awaiting engagement of the gripper with another bottle.

From the foregoing it can be seen that the detent has three major positions. First, there is the "retracted" position when the detent is in the outer end of the hole as, for example, when the grippers are in the inverted position of FIGS. 12 and 13.

A second position is the "cocked" position when the detent is in the hole but resting upon the surface 94 of the other arm, as shown in FIGS. 6–9.

The third position is the "lock" position when the detent has slid into the bore and slides across the adjacent surfaces of the two tong arms locking the grippers in a retracted position, as shown in FIGS. 10 and 11.

Having described my invention, I claim:

1. A gripper comprising,
two arms pivoted intermediate their ends to form tongs having opposed jaws at their lower ends,
a support,
links pivoted to said support and pivoted to respective upper ends of said arms to connect said tongs to said support,
said jaws having a closed position when said tongs and links are extended away from said support and an open position when said tongs are moved toward said support,
and a detent movably mounted in a hole in one of said arms and engageable with the other of said arms to hold said jaws in open position after said jaws are moved toward said support, said hole lying at an angle to horizontal when said gripper is in a normal position with said tongs depending from said support,
said detent having an inoperative position engaging one surface of said other arm when said jaws are closed, and an operative position engaging another surface of said other arm to hold said jaws in open position,
said detent being urged by gravity to move from said inoperative position to said operative position when said jaws are downwardly depending and spread apart.

2. A gripper according to claim 1,
said tongs extending downwardly to close said jaws prior to movement of said detent to operative position as said gripper swings from an inverted, retracted position to a normal depending position.

3. A gripper comprising,
two arms pivoted intermediate their ends to form tongs having opposed jaws at their lower ends,
a support,
links pivoted to said support and pivoted to respective upper ends of said arms to connect said tongs to said support,
said jaws having a closed position when said tongs and links are extended away from said support and an open position when said tongs are moved toward said support,
and a detent movably mounted on one of said arms and engageable with the other of said arms to hold said jaws in open position after said jaws are moved toward said support,
said detent having an inoperative position, engaging one surface of said other arm when said jaws are closed, and an operative surface engaging a bore in said other arm to hold said jaws in open position.

4. A gripper comprising,
two arms pivoted intermediate their ends to form tongs having opposed jaws at their lower ends,
a support,
links pivoted to said support and pivoted to respective upper ends of said arms to connect said tongs to said support,
said jaws having a closed position when said tongs and links are extended away from said support and an open position when said tongs are moved toward said support,
and a detent movably mounted on one of said arms and engageable with the other of said arms to hold said jaws in open position after said jaws are moved toward said support,
one of said arms having a hole lying at an angle to horizontal when said gripper is in a normal position with said tongs depending from said support,
said detent being slidable in said hole,
the other of said arms having a bore alignable with said hole when said jaws are open,
said detent having the following three positions:
(a) a "retracted" position when said detent is in the end of said hole remote from said bore,
(b) a "cocked" position when said detent rests upon the surface of said other arm,
(c) a "locked" position when said detent has slid into said bore and lies in said bore and hole.

5. A bottle gripper comprising,
a suppport,
at least one pair of links pivoted at one of their ends to said support,
a pair of crossed tong arms pivoted together intermediate their ends,
each said tong arm having an upper end pivoted to another end of a respective link,
said tong arms having lower ends configurated to form bottle gripping jaws,
said tong arms having an extended closed position and a retracted open position with respect to said support,
a hole in one of said tong arms overlying the other of said tong arms,
a bore in the other of said tong arms,
said bore and hole being misaligned when said tong arms are in an extended position,
said bore and hole being in an aligned position when said tong arms are in a retracted position,
and a detent slidably mounted in said hole and movable partially into said bore when said bore and hole are aligned.

6. A gripper as in claim 5 in which said hole is inclined at an angle of about 30° to horizontal when said tong arms depend downwardly from said support, thereby gravity-biasing said detent toward said other tong arm.

7. In an uncaser having a container transfer mechanism comprising,
a pair of endless chains forming a conveyor, a plurality of transverse rods secured between said chains, a plurality of grippers on said rods, each said gripper comprising, a support mounted on said rod, tongs having container gripping jaws at their free ends and means connecting said tongs to said support, the improvement comprising, a gravity-operated detent mounted in a hole in said tongs said hole lying at an angle to horizontal when said gripper is in a normal position with tongs depending from said support, said detent having an inoperative position engaging one surface of said tongs when said jaws are closed, and an operative position engaging another surface of said tongs to hold said jaws in open position, each said gripper swinging from an inverted, jaws-open position on the upper reach of said conveyor to a depending, jaws-closed position in which said tongs extend from said support, said detent moving by gravity to an inoperative position after said tongs have extended, said inclined hole permitting said detent to stay in an inoperative position as each gripper swings from inverted, jaws-open position on the upper reach, to an extended, jaws-closed position on the lower reach of said chains.

* * * * *